US006486891B1

(12) United States Patent
Rice

(10) Patent No.: US 6,486,891 B1
(45) Date of Patent: Nov. 26, 2002

(54) AUTOMATED BOOKMARKING OF ONLINE ADVERTISEMENTS

(76) Inventor: Ann M. Rice, 1221 S. St. Paul, Denver, CO (US) 80210

( * ) Notice: Subject to any disclaimer, the term of this patent is extended or adjusted under 35 U.S.C. 154(b) by 0 days.

(21) Appl. No.: 09/370,369

(22) Filed: Aug. 9, 1999

Related U.S. Application Data

(60) Provisional application No. 60/137,613, filed on Jun. 3, 1999.

(51) Int. Cl.[7] ................................................. G09G 5/00
(52) U.S. Cl. ...................................... 345/738; 345/854
(58) Field of Search ............................... 345/738, 739, 345/749, 845, 853, 854, 744, 704; 707/501; 709/217

(56) References Cited

U.S. PATENT DOCUMENTS

| | | | |
|---|---|---|---|
| 5,572,643 A | 11/1996 | Judson | 395/793 |
| 5,737,619 A | 4/1998 | Judson | 395/761 |
| 5,809,242 A | 9/1998 | Shaw et al. | 395/200.47 |
| 5,813,007 A | 9/1998 | Nielson | 707/10 |
| 5,848,397 A | 12/1998 | Marsh et al. | 705/14 |
| 5,848,410 A | 12/1998 | Walls et al. | 707/4 |
| 5,862,325 A | 1/1999 | Reed et al. | 395/200.31 |
| 5,887,133 A | 3/1999 | Brown et al. | 395/200.3 |
| 5,907,322 A | 5/1999 | Kelly et al. | 345/327 |
| 5,917,491 A * | 6/1999 | Bauersfeld | 345/810 |
| 5,918,237 A * | 6/1999 | Montalbano | 707/513 |
| 5,960,409 A * | 9/1999 | Wexler | 705/14 |
| 6,009,410 A * | 12/1999 | LeMole et al. | 705/14 |
| 6,032,162 A * | 2/2000 | Burke | 707/501 |
| 6,184,886 B1 * | 2/2001 | Bates et al. | 345/854 |
| 6,189,030 B1 * | 2/2001 | Kirsch et al. | 709/224 |
| 6,292,813 B1 * | 9/2001 | Wolfe | 707/513 |
| 6,311,185 B1 * | 10/2001 | Markowitz et al. | 707/10 |
| 6,324,566 B1 * | 11/2001 | Himmel et al. | 709/203 |

OTHER PUBLICATIONS

Katherine Gallagher and Jeffrey Parsons, "A Framework for Targeting Banner Avertising On the Internet," Faculty of Business Administration, Memorial University of Newfoundland, pp. 265–274, 1997.*
User Guide, vol. I, "Explore the Storefront", Intershop Communications, Chapter 1, 1997–1998, pp. 25–27.
User Guide, vol. II, "Template Language Extension", Intershop Communications, Chapter 4, 1997–1998, pp. 10–24.
User Guide, vol. II, "Templates", Intershop Communications, Chapter 5, 1997–1998, pp. 112–113.

* cited by examiner

Primary Examiner—Raymond J. Bayerl
Assistant Examiner—Tadesse Hailu
(74) Attorney, Agent, or Firm—Faegre & Benson LLP

(57) ABSTRACT

A method of facilitating the automated bookmarking of a web page associated with an online advertisement is disclosed. According to one embodiment of the present invention, a method of Internet advertising includes causing an advertisement to be presented to a user. The advertisement operates in accordance with traditional click-through advertising functionality in response to a first type of user selection, e.g., left mouse click or selection in a first area of the advertisement, and causes a web page associated with the advertisement to be bookmarked in the user's browser in response to a second type of user selection, e.g., right mouse click or selection in a second area of the advertisement.

34 Claims, 10 Drawing Sheets

AUTOMATED BOOKMARKING OF ONLINE ADVERTISEMENTS

This application claims the benefit of U.S. Provisional Application No. 60/137,613, filed Jun. 3, 1999, which is incorporated herein by reference.

COPYRIGHT NOTICE

Contained herein is material that is subject to copyright protection. The copyright owner has no objection to the facsimile reproduction of the patent disclosure by any person as it appears in :the Patent and Trademark Office patent files or records, but otherwise reserves all rights to the copyright whatsoever.

BACKGROUND OF THE INVENTION

1. Field of the Invention

The invention relates generally to the field of advertising. More particularly, the invention relates to a method for facilitating the automated bookmarking of the source of an online advertisement, such as a banner, tile, or link, for later viewing.

2. Description of the Related Art

Internet advertisers are currently challenged by click-through rates averaging approximately 1%. Internet advertisers are presently unable to grab the user's attention and commitment. The Internet user is often in the midst of reading or researching something and doesn't want to invest the time, disrupt the current task at hand and click-through to another site, thus risking losing their train of thought or their place within their current search/work.

In light of the foregoing, what is needed is a more effective means of Internet advertising. In particular, it is desirable to provide a more intelligent mechanism to preserve a web page associated with an Internet advertisement so that an Internet user may view the web page at a more convenient time.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

BRIEF SUMMARY OF THE INVENTION

Figure 1:
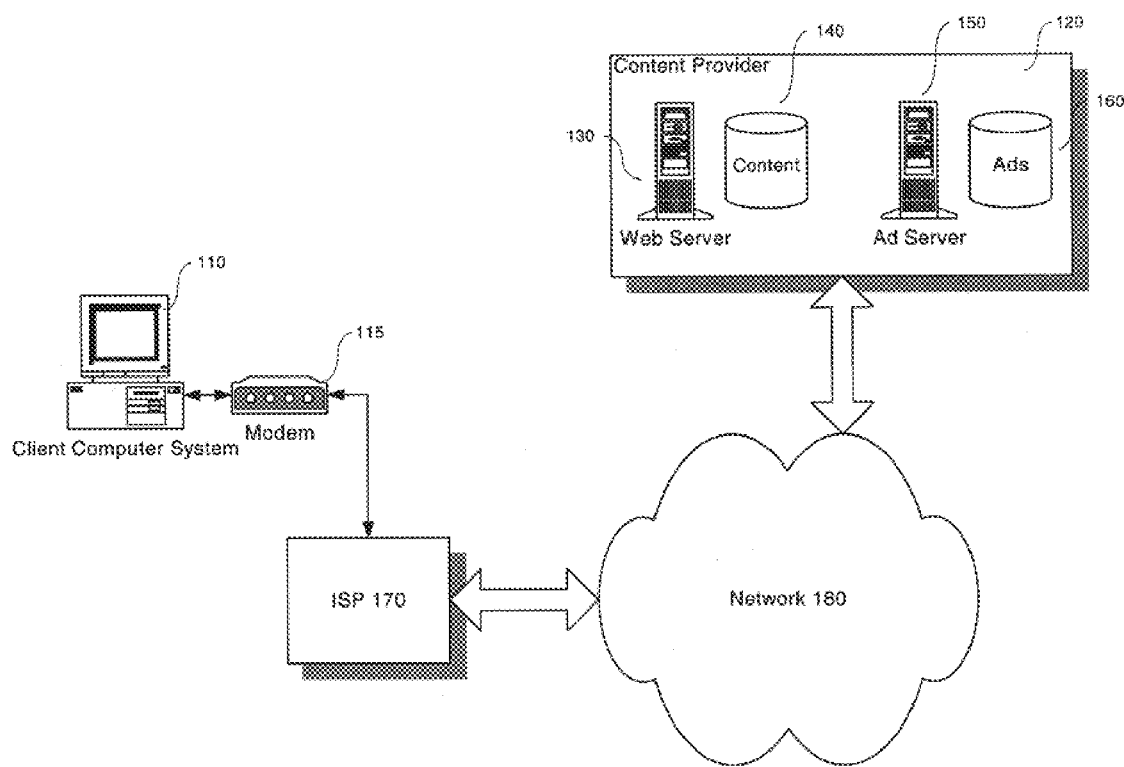
FIG. 1 is a simplified block diagram that conceptually illustrates an exemplary network environment in which the present invention may be employed.

A new form of online (network) advertising and a method of facilitating the automated bookmarking of a web page associated with an online advertisement are described. According to one aspect of the present invention, a new method of Internet advertising causes an advertisement to be presented to a user. The advertisement operates in accordance with traditional click-through advertising in response to a first type of user selection and causes a web page associated with the advertisement to be bookmarked in the user's browser in response to a second type of user selection.

According to another aspect of the present invention, a new type of banner advertisement, referred to as a "Bookmark Banner," is displayed on a web page rather than a traditional banner advertisement. The Bookmark Banner may include an area comprising traditional advertising which supports click through in a traditional fashion. The Bookmark Banner also includes an area that causes the source of the advertisement to be bookmarked in the user's web browser, for example. Subsequently, the user may view the source of the advertisement by selecting the previously created bookmark.

According to yet another aspect of the invention, the network advertisement may exclude traditional click-through support and provide for automated bookmarking of a source of the advertisement.

Other features of the present invention will be apparent from the accompanying drawings and from the detailed description which follows.

DETAILED DESCRIPTION OF THE INVENTION

A new form of online advertising and a method of facilitating the automated bookmarking of a web page associated with an online advertisement are described. Broadly stated, according to the present invention, users are provided with the ability to automatically bookmark a web page associated with an advertisement that is currently displayed. For example, according to one embodiment of the present invention, the Uniform Resource Locator (URL) of the home page of the advertiser's web site is stored (e.g., "bookmarked") in the user's web browser. Subsequently, the user may employ the bookmark to link to the advertiser's web site. Alternatively, the advertiser may choose to associate the URL of some other web page with the advertisement, such as a link to further advertising materials, a link to the advertisement itself, or a link to some other web page. These and other features seek to provide more exposure for advertisers by allowing interested users to view a web page associated with an advertisement at their convenience.

The present invention includes various steps, which will be described below. The steps of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Importantly, while embodiments of the present invention will be described with reference to transferring HyperText Markup Language (HTML) documents, e.g., "web pages," which include various improved types of advertisements from servers to clients over the Internet using the HyperText Transfer Protocol (HTTP), the method and apparatus described herein are equally applicable to other types of network environments, such as enterprise Intranets and other public and private LANs or WANs.

Exemplary Network Environment

FIG. 1 is a simplified block diagram that conceptually illustrates an exemplary network environment in which the present invention may be employed. A client computer system 110 may view content supplied by a content provider 120 by way of a network 180, such as the Internet, a Wide Area Network (WAN), a Local Area Network (LAN), or other public or private network, e.g., a company Intranet. While it is appreciated that the Internet comprises interconnected networks of millions of computer systems, for simplicity only two systems are depicted in FIG. 1.

The client computer system 110 may employ a form of client software, known as a Web "browser" (not shown), which is used to display Web pages as well as traditional files on the client computer system 110. The client computer system 110 may access the network directly via a modem 1 15 or indirectly through an Internet Service Provider 170, such as America Online, Microsoft Network, AT&T Worldnet, PSI Net, Compuserve, or the like. It is appreciated that individual or corporate users may establish connections to the network 180 in various other ways, such as ISDN, xDSL, cable modem, satellite communications channels, and/or cellular communications, etc.

In this example, the content provider 120 includes both a web server 130 that serves up content 140 requested by client systems, such as client computer system 110, connected to the network 180 and an ad server 150 that generates advertisements 160 for inclusion in the pages requested by client systems. It is appreciated, however, that other content providers may have more or less network servers. For example, other providers may include either a web server or an ad server and not the other.

An Exemplary Computer System

Figure 2:
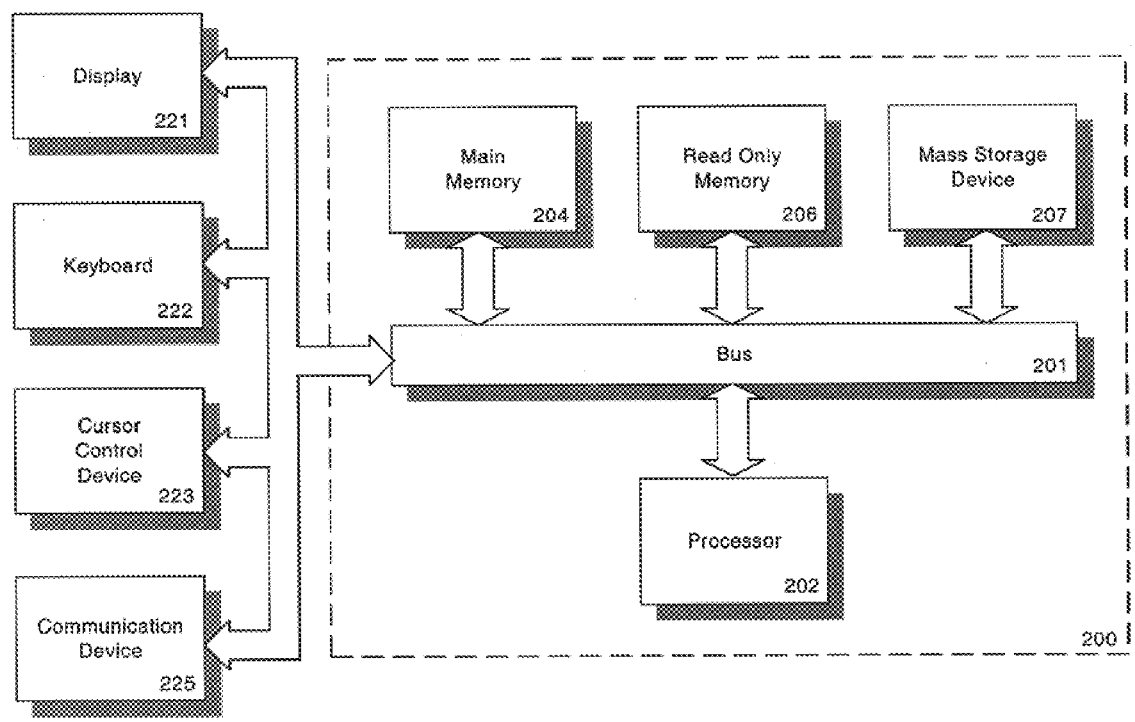
FIG. 2 is an example of a typical computer system upon which one embodiment of the present invention or components thereof may be implemented.

Having briefly described the context in which the present invention may be employed, an exemplary machine in the form of a computer system 200 in which features of the present invention may be implemented will now be described with reference to FIG. 2. Computer system 200 comprises a bus or other communication means 201 for communicating information, and a processing means such as processor 202 coupled with bus 201 for processing information. Computer system 200 further comprises a random access memory (RAM) or other dynamic storage device 204 (referred to as main memory), coupled to bus 201 for storing information and instructions to be executed by processor 202. Main memory 204 also may be used for storing temporary variables or other intermediate information during execution of instructions by processor 202. Computer system 200 also comprises a read only memory (ROM) and/or other static storage device 206 coupled to bus 201 for storing static information and instructions for processor 202.

A data storage device 207 such as a magnetic disk or optical disc and its corresponding drive may also be coupled to computer system 200 for storing information and instructions. Computer system 200 can also be coupled via bus 201 to a display device 221, such as a cathode ray tube (CRT) or Liquid Crystal Display (LCD), for displaying information to a computer user. For example, web pages including content and advertisements may be displayed to an Internet user browsing the World-Wide Web.

Typically, an alphanumeric input device 222, including alphanumeric and other keys, is coupled to bus 201 for communicating information and/or command selections to processor 202. Another type of user input device is cursor control 223, such as a mouse, a trackball, or cursor direction keys for communicating direction information and command selections to processor 202 and for controlling cursor movement on display 221.

A communication device 225 is also coupled to bus 201 for providing access from/to clients/servers via the Internet, for example. The communication device 225 may include a modem, a network interface card, or other well known interface devices, such as those used for coupling to Ethernet, token ring, or other types of networks. In any event, in this manner, the computer system 200 may be coupled to a number of clients/servers via a conventional network infrastructure, such as an enterprise's Intranet (e.g., WAN) and/or the Internet, for example.

The client computer system 110, the web server 130, and/or the ad server 150 may comprise a computer system, such as computer system 200. Therefore, embodiments of the present invention relate to the use of computer system 200 to execute one or more software programs within main memory 204 to cause online advertisements to operate in the manner described below. It is appreciated that a lesser or more equipped computer system than the example described above may be desirable for certain implementations. Therefore, the configuration of computer system 200 will vary from implementation to implementation depending upon numerous factors, such as price constraints, performance requirements, technological improvements, and/or other circumstances.

Online (Network) Advertising

Figure 3:
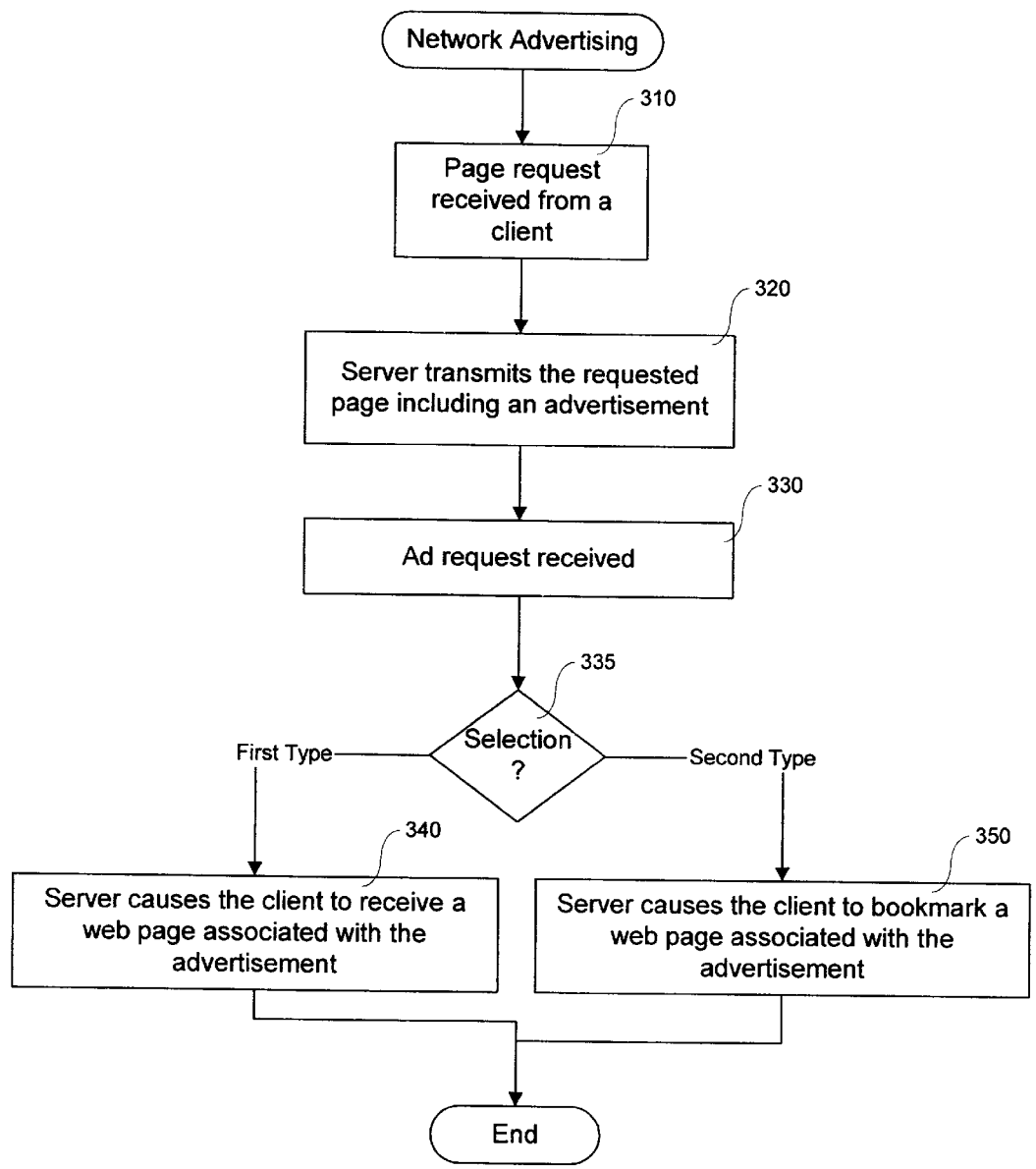
FIG. 3 is a flow diagram illustrating online (network) advertising processing according to one embodiment of the present invention.

Referring now to FIG. 3, online advertising processing will be described according to one embodiment of the present invention. In one embodiment, the steps described below may be performed under the control of a programmed processor, such as processor 202, in a network server, such as web server 130 or ad server 150. However, in alternative embodiments, the steps may be fully or partially implemented by any programmable or hardcoded logic, such as Field Programmable Gate Arrays (FPGAs), TTL logic, or Application Specific Integrated Circuits (ASICs), for example.

According to this example, at step 310 a page request is received from a client. The server responds to the page request by transmitting the requested page at step 320. One or more advertisements may be embedded within the requested page. Typically, the advertisements are selectable graphics, such as banner ads, tiles, or the like, and/or hypertext links, generated by ad management software (not show) on the web server 130 or the ad server 150.

A user viewing the requested page at the client may select an advertisement. For example, the user may position the cursor over the advertisement using a cursor control device, such as a mouse, trackball, or the like, and activate the cursor control device. The selection of the advertisement causes the browser software running on the client to transmit an HTTP request (an "ad request") to the server that served up the advertisement. At step 330, the ad request is received by the server.

According to one embodiment of the present invention, advertisements can be selected in at least two different manners and the server may respond differently to each type of ad selection. For purposes of understanding FIG. 3, the types of ad selection are not important. Various exemplary types of ad selection are described below. At step 335, the type of ad selection associated with the ad request is determined. If the ad selection is of a first type (e.g., a click-through selection), then processing proceeds with step 340; otherwise, if the ad selection is of a second type (e.g., a bookmark selection), then processing continues with step 350. At step 340, in response to the first type of ad selection, the server causes the client to receive a web page associated with the advertisement, such as the home page of the advertiser, a particular promotional page from the advertiser's web site, or some other web page the advertiser chose to associate with the advertisement. At step 350, the server causes the client to bookmark a web page associated with the advertisement. Again, the web page associated with the advertisement may be the home page of the advertiser, a promotional page on the advertiser's site, or some other web page. While the web page associated with the two types of ad selection may often be the same, it is contemplated that advertiser's may wish to associate different web pages with the different types of ad selection. For example, one web page, e.g., a promotional page, may be associated with the first type of ad selection and another web page, e.g., the advertiser's home page, may be associated with the second type of ad selection. Advantageously, in the manner described above, a new and innovative means of Internet advertising is provided which allows Internet users viewing an advertisement to either click-through to a web page associated with the advertisement or bookmark a web page associated with the advertisement.

Online (Network) Advertising

According to various embodiments of the present invention, the user viewing an online advertisement may indicate his/her preference to view content associated with an advertisement or to bookmark a web page associated with the advertisement. Two alternative mechanisms for performing automated bookmarking are described below.

Figure 4A:
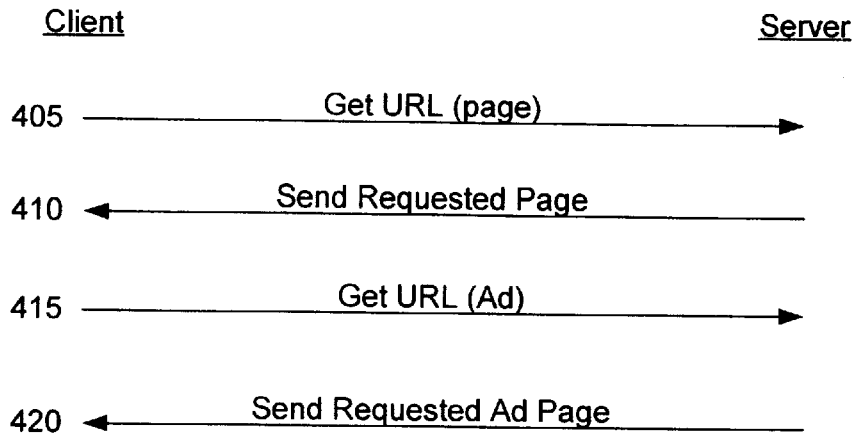
FIG. 4A conceptually illustrates a client-server exchange associated with traditional click-through to an advertiser designated web page according to one embodiment of the present invention.

Before discussing the two alternative mechanisms for performing automated bookmarking, a client-server exchange associated with traditional click-through to an advertiser designated web page is described with reference to FIG. 4A. Initially, a client requests a web page from a server by using an HTTP GET request which includes the URL of the desired web page, for example (405). The server responds by transmitting the requested page to the client (410). If the user wishes to view content associated with an advertisement on the requested page, the client transmits a request for a web page associated with the advertisement (415). Depending on where the content associated with the advertisement resides, the server with which the client has been communicating may provide the requested ad page or it may be provided by another server on which the advertising content resides.

Figure 4B:
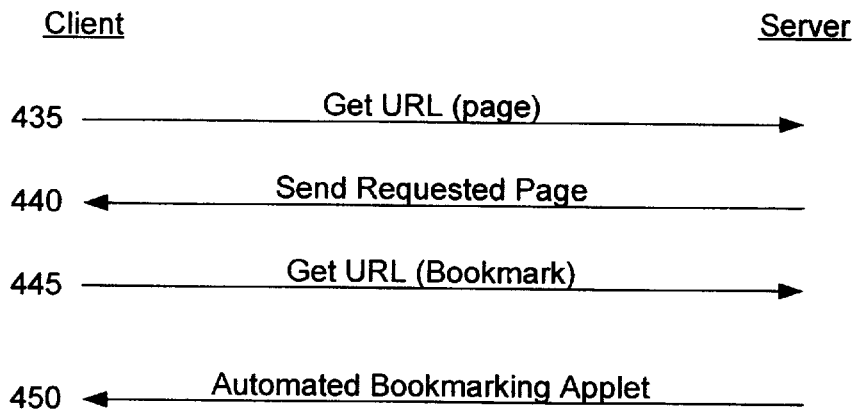
FIG. 4B conceptually illustrates a client-server exchange associated with automated bookmarking of a web page associated with an online (network) advertisement according to one embodiment of the present invention.

Two exemplary approaches for performing automated bookmarking will now be described with reference to FIG. 4B and FIG. 4C. FIG. 4B conceptually illustrates a client-server exchange associated with automated bookmarking of a web page associated with an online advertisement according to one embodiment of the present invention.

In this example, the client-server exchange begins as described above. First, the client requests that a web page be delivered from the server (435) and the server provides the requested page (440). However, rather than being limited to merely clicking through to view the advertising content, the advertisement also supports automated bookmarking which allows users to bookmark the advertiser's site (or some other web page associated with the advertisement) instead of clicking through at the time the advertisement is presented. As discussed above, previously, advertisers have been challenged by click-through rates, averaging. 1%, and have been unable to grab the user's attention and commitment. The Internet user is often in the midst of performing other tasks when online ads are presented and even if the ad sounds interesting the user may be hesitant to disrupt his/her current task. Advantageously, according to one embodiment, the improved online advertisements described herein and the associated methods of operation allow those users that are willing to click-through to the advertiser's web site immediately to do so. Additionally, the user is given the valuable option of bookmarking a web page associated with the online advertisement thereby allowing the user to visit the advertiser's web site at a more convenient time. It is contemplated that in alternative embodiments, the online advertisements described herein may provide the ability to bookmark the advertiser's site without the accompanying ability to click-through to the advertiser's web site in a traditional fashion.

At any rate, if the user indicates he/she wishes to bookmark a web page associated with an advertisement, then the client sends a request to bookmark the web page to the server (415). In response to the bookmark request, the server transmits to the client an automated bookmarking applet, such as a Java applet. The automated bookmarking applet contains program code (e.g., byte codes) which causes a browser running on the host client system to bookmark a specified URL. Therefore, when the automated bookmarking applet is received by the client, it is interpreted and executed by the client and a web page associated with the advertisement, such as the web page identified by an HREF attribute in the HTML of the advertisement, is bookmarked in the browser software running on the client. Alternatively, the URL to bookmark may be dynamically or statically provided as part of the applet itself. It is also contemplated that the automated bookmarking applet could be downloaded to the client concurrently with the web page with which the advertisement is associated and activated at a later time by the client. In this manner, the client may trap the bookmark request and activate the previously downloaded applet without having to wait for another server response.

Figure 4C:
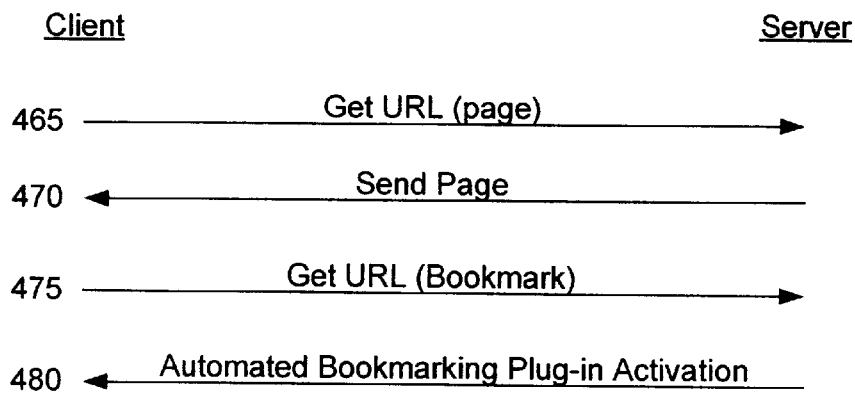
FIG. 4C conceptually illustrates a client-server exchange associated with automated bookmarking of a web page associated with an online (network) advertisement according to another embodiment of the present invention.

Referring now to FIG. 4C, a client-server exchange associated with automated bookmarking of a web page associated with an online advertisement according to another embodiment of the present invention will be described. Again, in this example, the client-server exchange begins with the client requesting an initial web page from the server (465) and the server providing the requested page (470). However, as in FIG. 4B, rather than being limited to merely clicking through to view the advertising content, the advertisement also supports automated bookmarking. If the user indicates he/she wishes to bookmark a web page associated with an advertisement, then the client sends a request to bookmark the web page to the server (475). In response to the bookmark request, the server transmits to the client a data stream that triggers an automated bookmarking plug-in residing on the client. For example, a file may be transmitted by the server that includes a special extension, e.g., ".bok," ".bkm," or the like, and contains therein the URL of the web page to be recorded with the bookmark management facility of the browser. Of course, various other mechanisms may be employed to activate a client-side plug-in. In alternative embodiments, the bookmark selection may be trapped on the client-side and the plug-in triggered without the need for sending a bookmark request to the server. In any event, once the plug-in is activated, it causes a browser running on the host client system to bookmark a specified URL. As above, the web page associated with the advertisement to be bookmarked may be identified by an HREF attribute in the HTML of the advertisement or by some other means, e.g., a new or different HTML tag, for example.

According to one embodiment, a cookie or some other tracking mechanism, such as a unique code embedded in a URL, can be used to determine if a particular visitor is someone who previously bookmarked the content they are currently requesting. In this manner, feedback regarding actual usage of the automated bookmarks can be collected for the benefit of the advertisers.

Figure 5A:
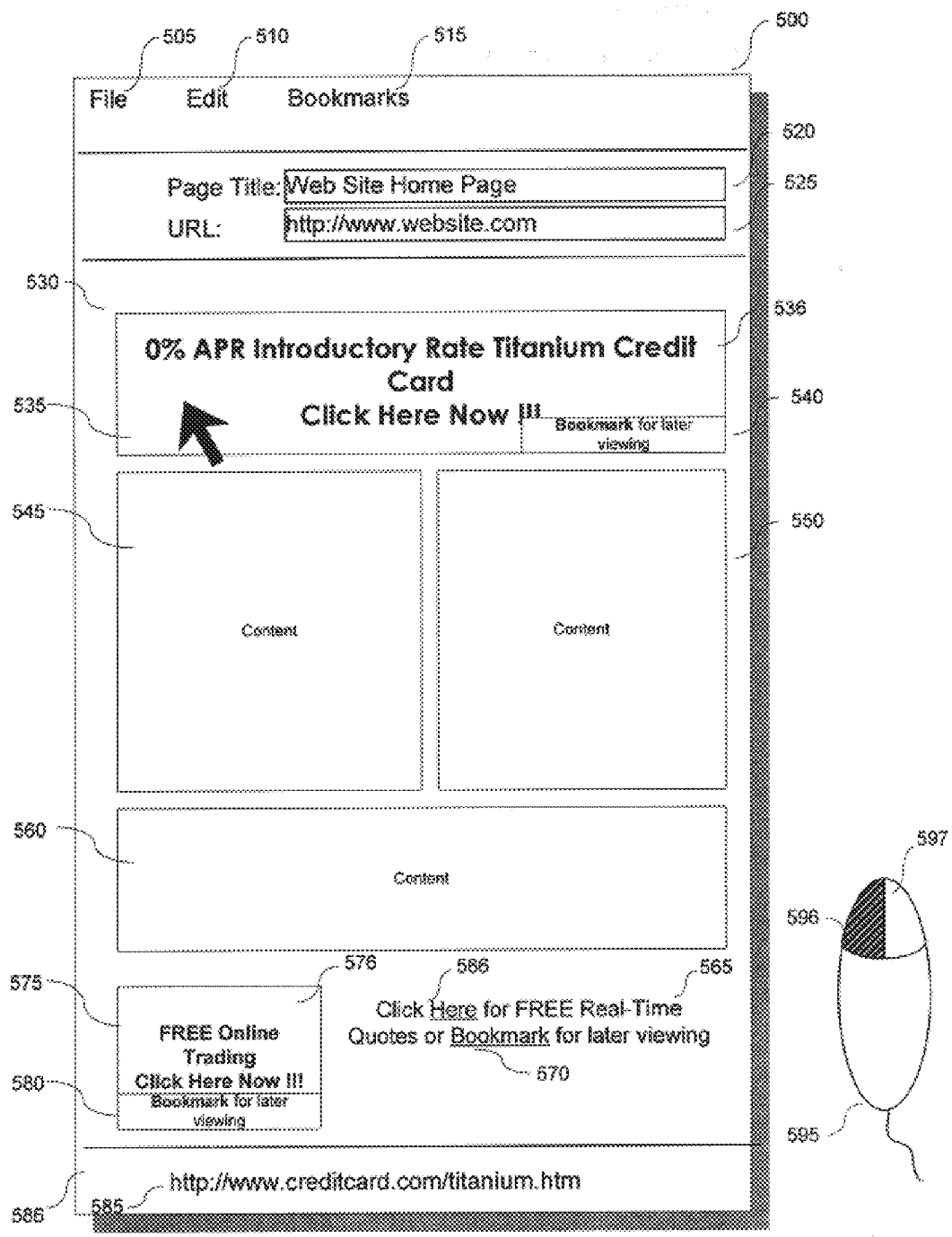
FIGS. 5A–5C illustrate a web page employing various types of online (network) advertisements according to one embodiment of the present invention.
Figure 5B:
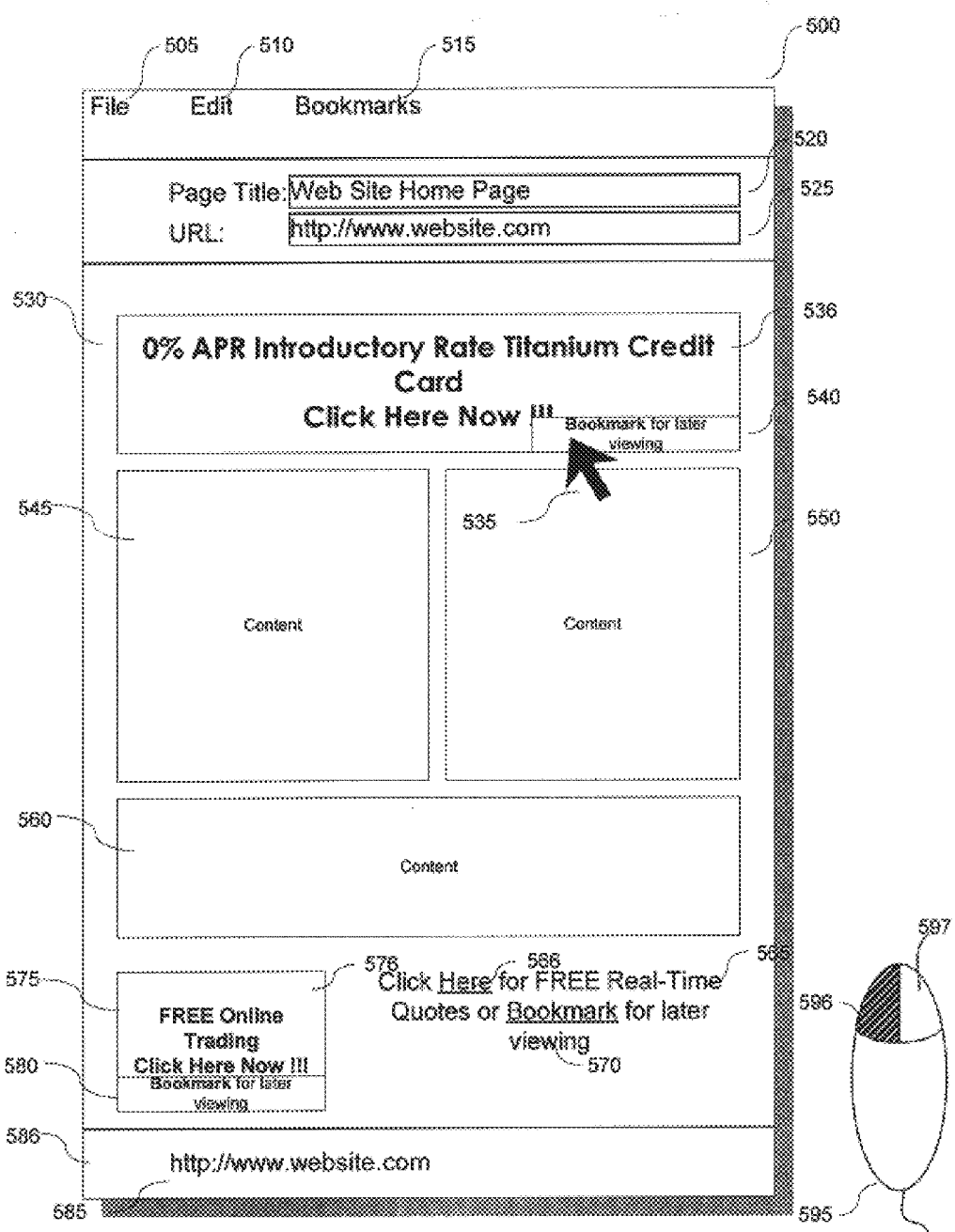
Figure 5C:
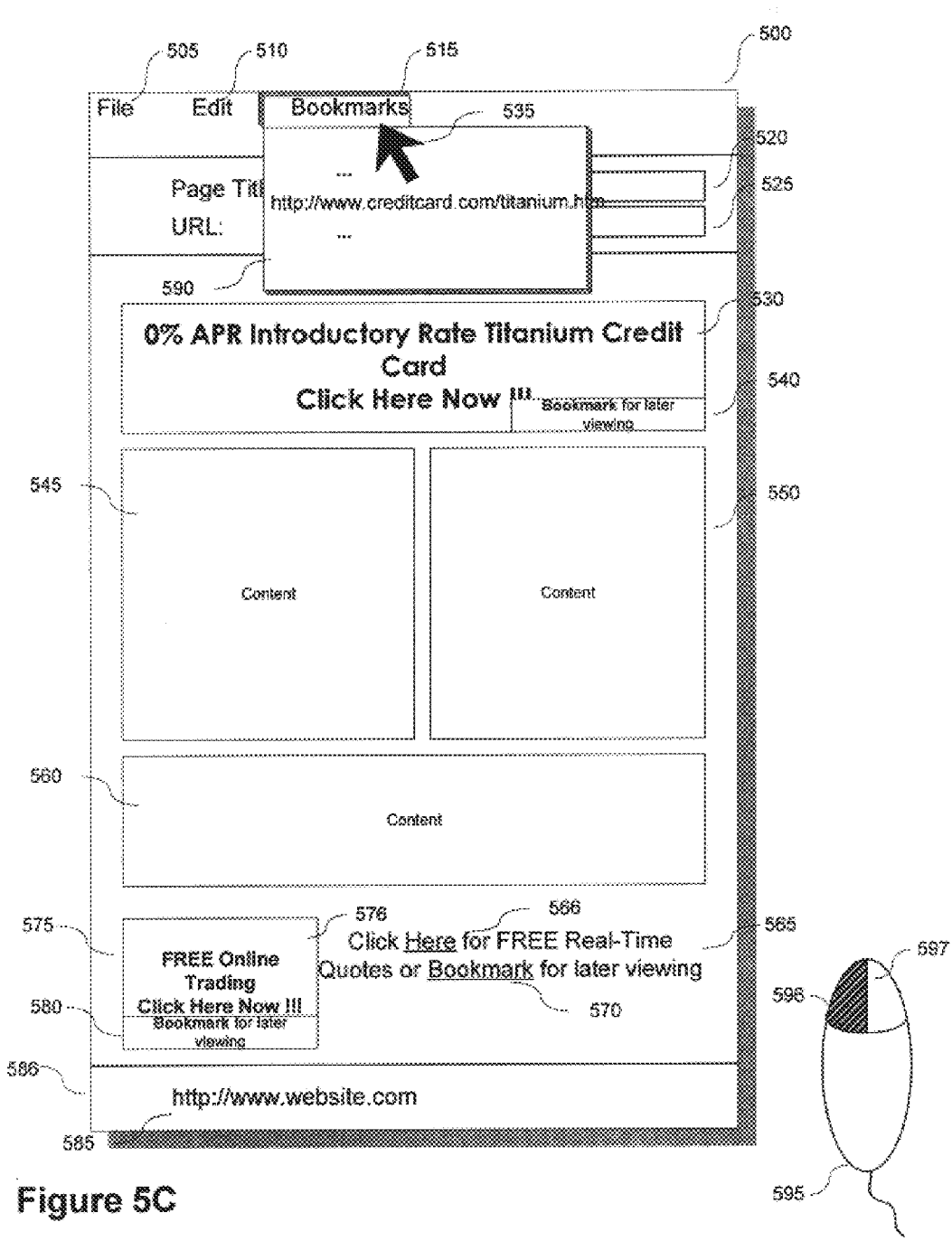

First Online Advertisement Embodiment FIGS. 5A–5C illustrate a web page employing various types of online advertisements according to one embodiment of the present invention. According to this embodiment, online advertisements distributed over a network, such as the Internet, allow Internet users viewing the advertisements to click on one of two selectable areas in the advertisement. Selection over a first area of the advertisement takes the user to the advertiser's site in a manner similar to traditional click-through advertisements. Selection over a second area of the advertisement automatically bookmarks a web page associated with the advertisement. Importantly, in terms of implementation, it is contemplated that the advertisement may comprise two separate clickable graphics, one on top of the other, or a single clickable graphic with two distinct selectable areas.

Turning now to FIG. 5A, a web page 500 is shown including a banner ad 530, a tile ad 575, and a text ad 565. The banner ad 530 includes a selectable area 536 which acts in accordance with traditional click-though functionality and a selectable area 540 which causes the automated bookmarking functionality described above. Similarly, the tile ad 575 includes a selectable area 576 for traditional click-through to the advertiser's web site and a selectable area 580 for automated bookmarking of a web page associated with the tile ad 575. As expected, the text ad 565 also includes two selectable areas, a hypertext link 566 which links the user to the advertisement web page and a hypertext link 570 which causes a web page associated with the text ad 565 to be bookmarked in the user's web browser. Importantly, while three specific types of online advertisements have been described, it is contemplated that the present invention may be useful in connection with other types of existing and future online advertising. For example, the present invention is equally applicable to full page advertisements.

In this example, the web page 500 also includes a tool bar including a file button 505, an edit button 510, and a bookmarks button 515. When selected, the bookmarks button 515 presents a list of web pages that have been bookmarked and allows the user to select one of the saved web pages to retrieve. Below the tool bar are a page title 520 that indicates the title of the web page currently being displayed and a URL 535 associated with the web page currently being viewed.

The web page 500 also includes a status bar 586 which provides an indication of the URL 585 of the document that will be retrieved if the cursor control device is activated. Finally, the. web page 500 includes content 545, 550, and 560.

A mouse 595 having a right button 596 and a left button 597 is shown to the right of the web page 500. The mouse 595 controls the position of cursor 535 on the display and allows the user to select items lying under the hot spot of the cursor 535. In the cursor's current position, if the user activates the left button (e.g., left clicks the mouse 595), the web page associated with URL 585 will be retrieved and displayed in place of the current web page 500.

Referring to FIG. 5B, web page 500 is again shown, but with the cursor 535 positioned over the selectable area 540 of the banner ad 530. Note that, in this example, the status bar 586 contains the URL of the current web page 500. This is due to the fact that activating the mouse 595 while the cursor 535 is in its present position will not cause a new web page to displayed. Rather, activating the mouse 595 while the cursor 535 is over the selectable area 540 of the banner ad 530 will instead cause a web page associated with the banner ad 530 to be bookmarked in the browser software running on the client. According to one embodiment, after the web page has been bookmarked, an indication of success or failure may be provided to the user. For example, a dialog box, an indication in the status bar, or an audible tone may provide feedback to the user regarding the success or failure of the bookmark operation.

Turning now to FIG. 5C, web page 500 is after the web page associated with the banner ad 530 has been bookmarked. Therefore, the web page associated with the banner ad 530 is shown in the list of bookmarked web pages 590.

Second Online Advertisement Embodiment

Figure 6A:
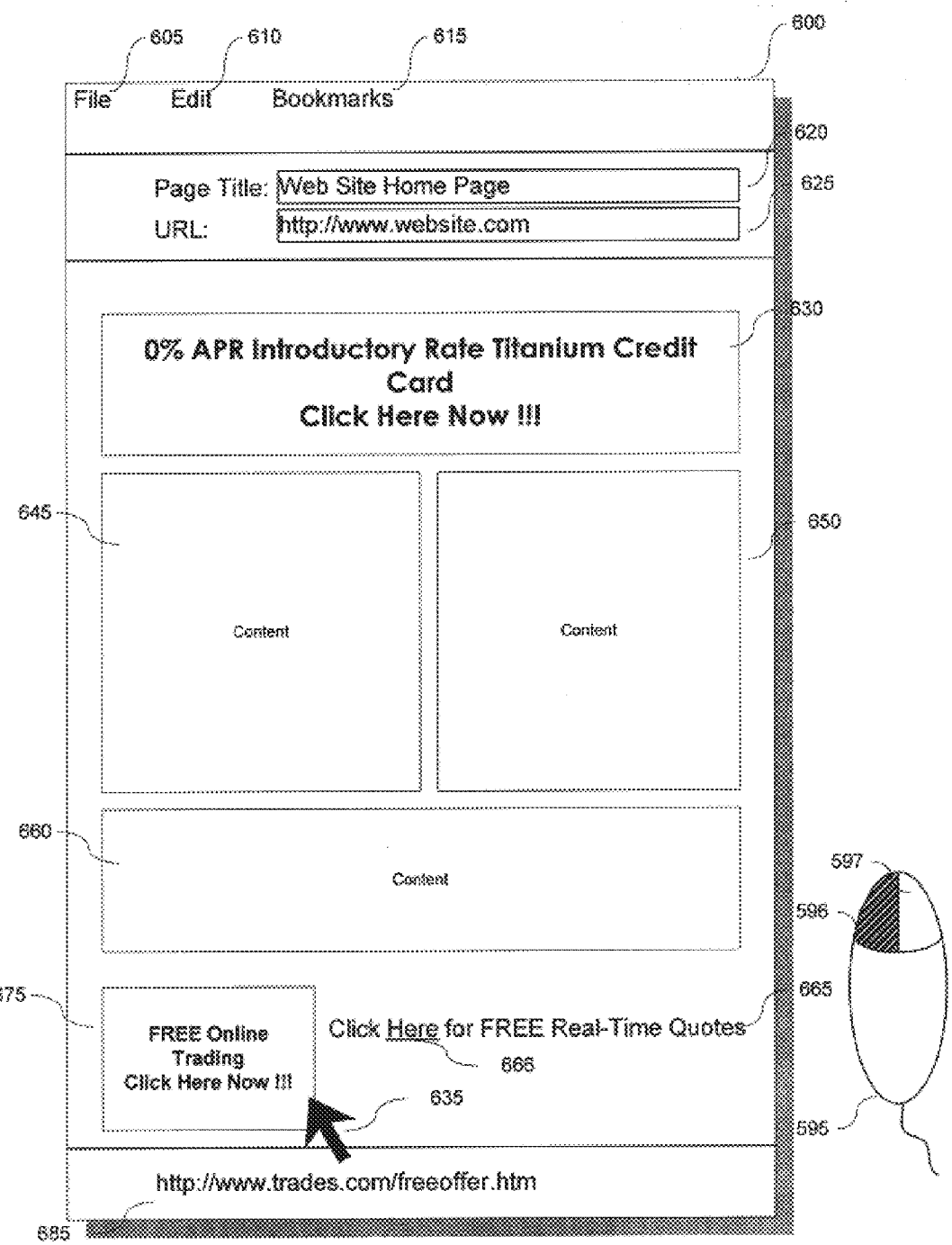
FIGS. 6A–6C illustrate a web page employing various types of online (network) advertisements according to another embodiment of the present invention.
Figure 6B:
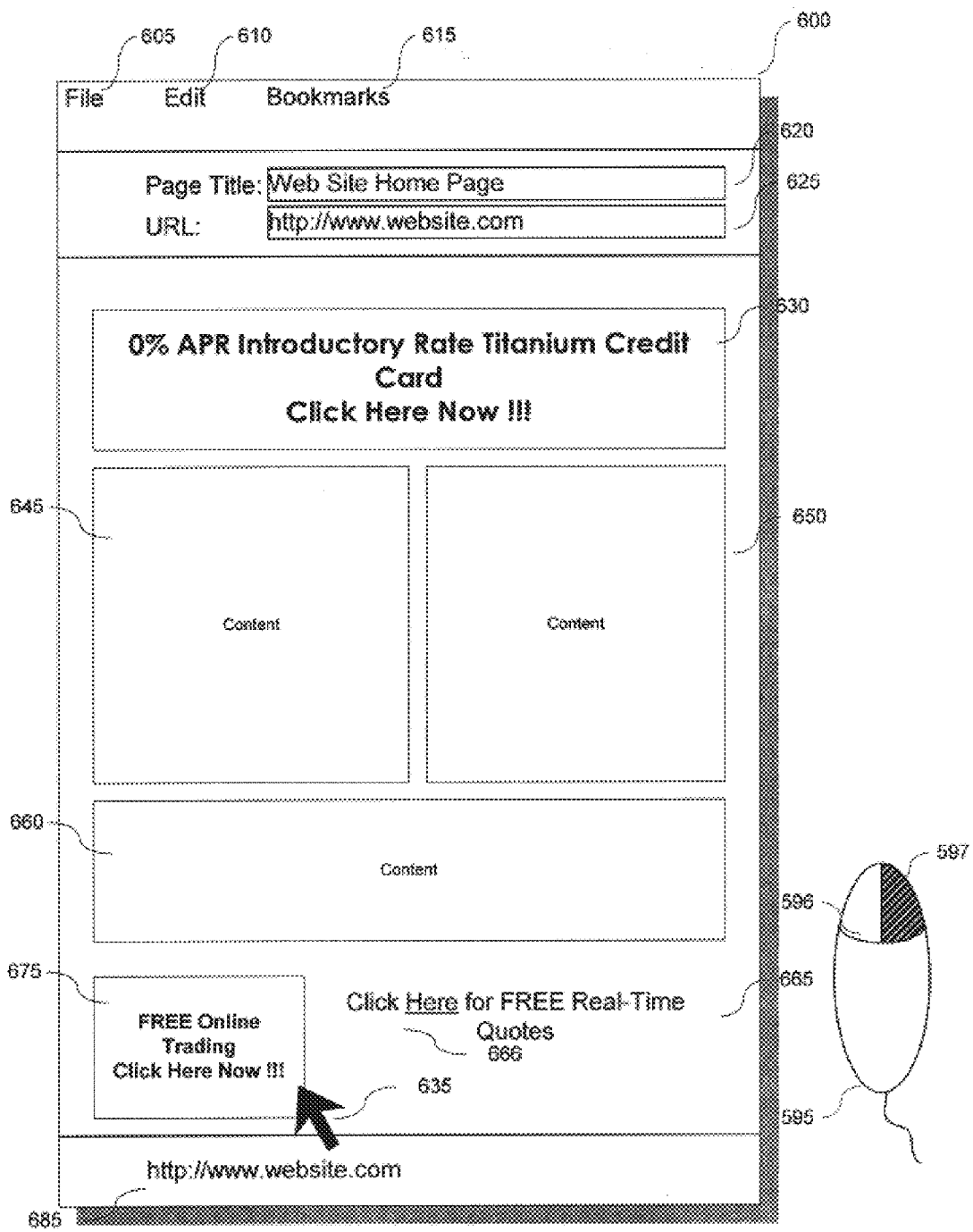
Figure 6C:
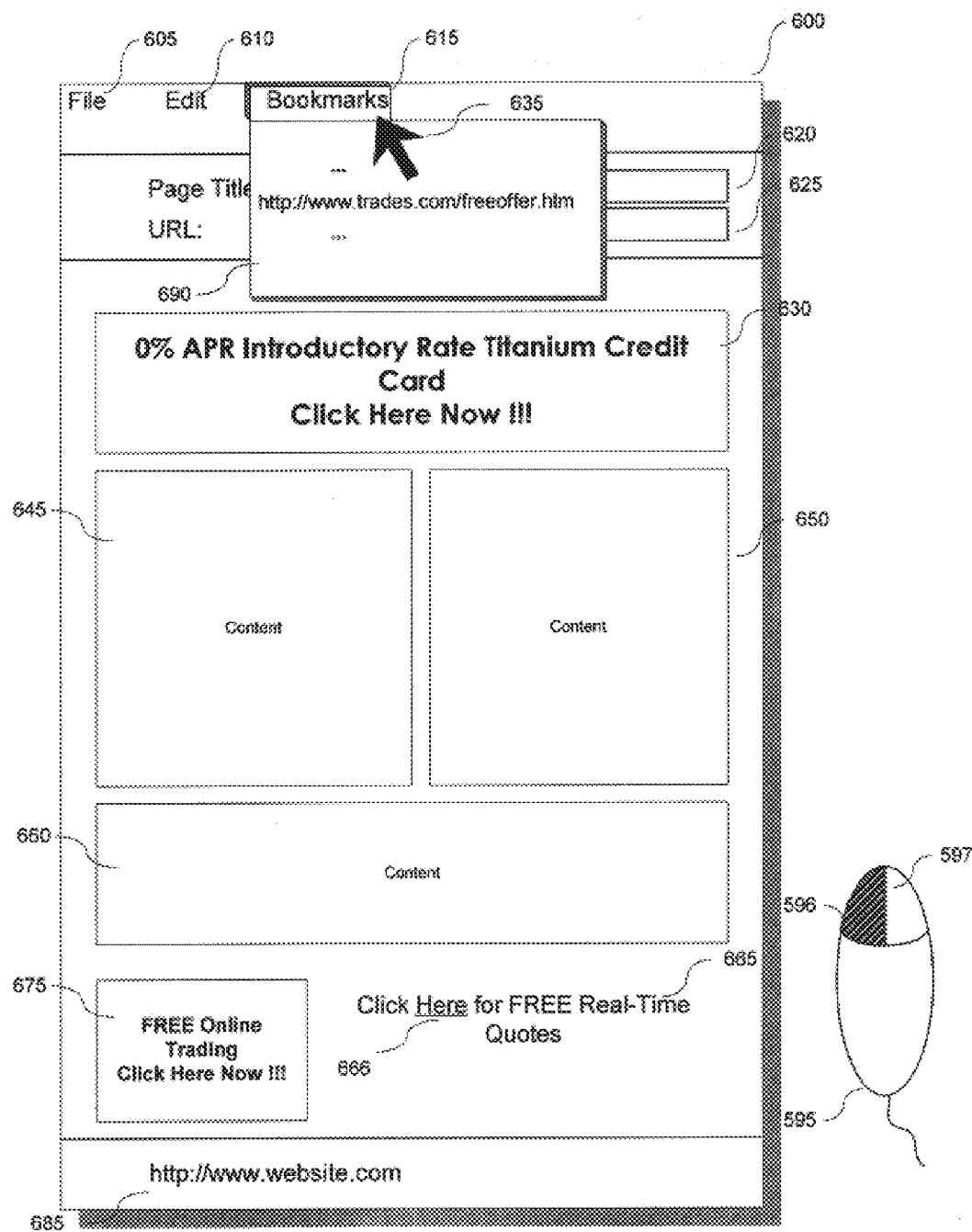

FIGS. 6A–6C illustrate a web page employing various types of online advertisements according to another embodiment of the present invention. According to this embodiment, online advertisements distributed over a network, such as the Internet, allow Internet users viewing the advertisements to select the advertisements in one of two manners. A first type of selection (e.g., a click-through selection), causes a web page from the advertiser's site to be retrieved and displayed on the client system in a manner similar to traditional click-through advertisements. A second type of selection (e.g., a bookmark selection), causes a web page associated with the advertisement to be automatically bookmarked in the user's browsers. Many possibilities exist for communicating the first and second types of selections from a cursor control device. For example, the type of selection may be indicated by a right mouse click, a left mouse click, a single click, or a double click.

Turning now to FIG. 6A, a web page 600 is shown including a banner ad 630, a tile ad 675, and a text ad 666. Each of the banner ad 630, the tile ad 675, and the text ad 666 cause either traditional click-though functionality or the automated bookmarking functionality described above depending upon the type of selection initiated by the user.

In this example, the web page 600 also includes a tool bar having a file button 605, an edit button 610, and a bookmarks button 615. As above, when the bookmark button is selected, a list of web pages that have been bookmarked are presented and the user may select one of the saved web pages to retrieve. Below the tool bar are a page title 620 that indicates the title of the web page currently being displayed and a URL 635 associated with the web page currently being viewed.

The web page 600 also includes a status bar 686 which provides an indication of the URL 685 of the document that will be retrieved if the cursor control device is activated. Finally, the: web page 600 includes content 645, 650, and 660.

In this example, and as above, the mouse 595 controls the position of cursor 635 on the display and allows the user to select items lying under the hot spot of the cursor 535. In the cursor's current position, if the user activates one button (e.g., left clicks the mouse 595), the web page associated with URL 685 will be retrieved and displayed in place of the current web page 500.

Referring to FIG. 6B, web page 600 is again shown, but in this example, the user is assumed to have caused the second type of selection (e.g., right clicked the mouse 595). Rather than retrieving the web page associated with tile ad 675, the second type of selection instead causes the web page associated with the tile ad 675 to be bookmarked in the browser software running on the client. As above, in one embodiment, confirmation of the success or failure of the bookmark operation may be provided to the user.

Referring now to FIG. 6C, web page 600 is shown after the web page associated with the tile ad 675 has been bookmarked. Therefore, the web page associated with the tile ad 675 is shown in the list of bookmarked web pages 690.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than; a restrictive sense.

What is claimed is:

1. A method of Internet advertising comprising:
    causing an advertisement to be presented to a user, the advertisement operating in accordance with traditional click-through advertising functionality responsive to a first type of user selection and causing a web page associated with the advertisement to be bookmarked in the user's browser software application in response to a second type of user selection; wherein
    the advertisement comprises a first area which is associated with the traditional click-through advertising functionality and a second area that is associated with bookmarking functionality;
    the first type of user selection comprises activation of an input device while a cursor is over the first area of the advertisement; and
    the second type of user selection comprises activation of an input device while the cursor is over the second area of the advertisement.

2. The method of claim 1, wherein the second type of user selection activates a plug-in residing on a computer system operated by the user.

3. The method of claim 1, wherein the first type of user selection comprises a first manner of activating a cursor control device.

4. The method of claim 3, wherein the first type of user selection comprises single clicking, double clicking, right clicking, or left clicking the cursor control device.

5. The method of claim 1, wherein the second type of user selection comprises a second manner of activating a cursor control device.

6. The method of claim 5, wherein the second type of user selection comprises single clicking, double clicking, right clicking, or left clicking the cursor control device.

7. The method of claim 1, wherein the second area of the advertisement is associated with an applet that implements the bookmarking functionality, and wherein activation of the input device while the cursor is over the second area of the advertisement causes the applet to be downloaded to and executed on a computer system operated by the user.

8. The method of claim 1, wherein the advertisement comprises a banner advertisement.

9. The method of claim 1, wherein the advertisement comprises a tile.

10. The method of claim 1, wherein the advertisement comprises a hypertext link.

11. The method of claim 1, wherein the advertisement comprises a full-page advertisement.

12. A method of Internet advertising comprising the step of causing an advertisement to be presented to a user, the advertisement having a first area which includes traditional click-through advertising and a second area that causes a web page associated with the advertisement to be bookmarked in the user's browser software application in response to user selection.

13. The method of claim 12, wherein the second area of the advertisement is associated with an applet, and wherein user selection of the second area causes the applet to be downloaded to and executed on a computer system operated by the user.

14. The method of claim 12, wherein the first area and the second area overlap.

15. The method of claim 12, wherein the first area and the second area are mutually exclusive.

16. A machine-readable medium having stored thereon data representing sequences of instructions, the sequences of instructions which, when executed by a processor, cause the processor to perform the steps of:
    causing an advertisement to be presented to a user, the advertisement operating in accordance with traditional click-through advertising functionality responsive to a first type of user selection;
    causing a web page associated with the advertisement to be bookmarked in the user's browser software application in response to a second type of user selection; wherein
    the advertisement comprises a first area which is associated with the traditional click-through advertising functionality and a second area that is associated with bookmarking functionality;
    the first type of user selection comprises activation of an input device while a cursor is over the first area of the advertisement; and
    the second type of user selection comprises activation of an input device while the cursor is over the second area of the advertisement.

17. The machine-readable medium of claim 16, wherein the second type of user selection activates a plug-in residing on a computer system operated by the user.

18. The machine-readable medium of claim 16, wherein the first type of user selection comprises a first manner of activating a cursor control device.

19. The machine-readable medium of claim 18, wherein the first type of user selection comprises single clicking, double clicking, right clicking, or left clicking the cursor control device.

20. The machine-readable medium of claim 16, wherein the second type of user selection comprises a second manner of activating a cursor control device.

21. The machine-readable medium of claim 20, wherein the second type of user selection comprises single clicking, double clicking, right clicking, or left clicking the cursor control device.

22. The machine-readable medium of claim 16, wherein the second area of the advertisement is associated with an applet that implements the bookmarking functionality, and wherein activation of the input device while the cursor is over the second area of the advertisement causes the applet to be downloaded to and executed on a computer system operated by the user.

23. The machine-readable medium of claim 16, wherein the advertisement comprises a banner advertisement.

24. The machine-readable medium of claim 16, wherein the advertisement comprises a tile.

25. The machine-readable medium of claim 16, wherein the advertisement comprises a hypertext link.

26. The machine-readable medium of claim 16, wherein the advertisement comprises a full-page advertisement.

27. An online advertising system comprising:
a means for causing an advertisement to be presented to a user, the advertisement operating in accordance with traditional click-through advertising functionality responsive to a first type of user selection;
a means for causing a web page associated with the advertisement to be bookmarked in the user's browser software application in response to a second type of user selection; wherein
the advertisement comprises a first means for triggering the traditional click-through advertising functionality and a second means for triggering bookmarking functionality;
the first type of user selection comprises activation of an input device while a current position of a cursor corresponds to the first means; and
the second type of user selection comprises activation of the input device while the current position of the cursor corresponds to the second means.

28. The online advertising system of claim 22, wherein the second type of user selection activates a plug-in residing on a computer system operated by the user.

29. The online advertising system of claim 27, wherein the second means of the advertisement comprises a second area of the advertisement that is associated with an applet that implements the bookmarking functionality, and wherein activation of the input device while the cursor is over the second area of the advertisement causes the applet to be downloaded to and executed on a computer system operated by the user.

30. The online advertising system of claim 27, wherein the advertisement comprises a banner advertisement.

31. The online advertising system of claim 27, wherein the advertisement comprises a tile.

32. The online advertising system of claim 27, wherein the advertisement comprises a hypertext link.

33. The online advertising system of claim 27, wherein the advertisement comprises a full-page advertisement.

34. A method of Internet advertising comprising the steps of:
a step for causing an advertisement to be presented to a user, the advertisement operating in accordance with traditional click-through advertising functionality responsive to a first type of user selection and causing a web page associated with the advertisement to be bookmarked in the user's browser software application in response to a second type of user selection; wherein
the advertisement comprises a first area which is associated with the traditional click-through advertising functionality and a second area that is associated with bookmarking functionality; and wherein the method further comprises
a step for processing the first type of user selection that comprises activation of an input device while a current position of a cursor corresponds to the first area of the advertisement; and
a step for processing the second type of user selection that comprises activation of the input device while the current position of the cursor corresponds to the second area of the advertisement.

* * * * *